US010034542B2

(12) United States Patent
Giovannetti

(10) Patent No.: US 10,034,542 B2
(45) Date of Patent: Jul. 31, 2018

(54) DEVICE FOR JOINING OF PARTS OF FURNITURE AND FURNISHING ACCESSORIES

(71) Applicant: EFFEGI BREVETTI S.R.L., Segrate (Milan) (IT)

(72) Inventor: Antonio Giovannetti, Segrate (IT)

(73) Assignee: EFFEGI BREVETTI S.R.L., Segrate (Milan) (IT)

( * ) Notice: Subject to any disclaimer, the term of this patent is extended or adjusted under 35 U.S.C. 154(b) by 0 days.

(21) Appl. No.: 15/517,531

(22) PCT Filed: Sep. 4, 2015

(86) PCT No.: PCT/EP2015/070278
§ 371 (c)(1),
(2) Date: Apr. 7, 2017

(87) PCT Pub. No.: WO2016/055218
PCT Pub. Date: Apr. 14, 2016

(65) Prior Publication Data
US 2017/0303682 A1      Oct. 26, 2017

(30) Foreign Application Priority Data

Oct. 7, 2014 (IT) .............................. MI2014A1751

(51) Int. Cl.
*A47B 47/00* (2006.01)
*F16B 12/20* (2006.01)
(Continued)

(52) U.S. Cl.
CPC ........ *A47B 47/0091* (2013.01); *A47B 96/066* (2013.01); *F16B 12/2027* (2013.01);
(Continued)

(58) Field of Classification Search
CPC ...... F16B 12/2027; F16B 12/22; F16B 12/54; F16B 12/2036; A47B 47/0091; A47B 47/00; A47B 47/042
See application file for complete search history.

(56) References Cited

U.S. PATENT DOCUMENTS 6,299,397 B1    10/2001  Mengel
2010/0202852 A1*  8/2010  Krause ................ F16B 12/2027
                                                   411/272

FOREIGN PATENT DOCUMENTS

DE    10 2009 043179 A1    9/2011
EP       0 949 424 A2       1/1999

OTHER PUBLICATIONS

International Search Report, dated Nov. 20, 2015, from corresponding PCT application.

* cited by examiner

*Primary Examiner* — Daniel J Wiley
(74) *Attorney, Agent, or Firm* — Young & Thompson

(57) ABSTRACT

A joining device for parts of furniture and furnishing accessories, including a casing or container body suitable for being inserted in a seat formed in one of the components of the item of furniture to be joined and provided with an expansion bushing externally projecting with respect to an open end of the casing or container body and suitable for engaging with a further seat of a further component of the item of furniture to be joined to the component wherein the casing or container body is inserted, the joining device which includes a cam mechanism for a linear and reciprocated motion of an actuation unit co-operating in an expansion deformation movement of the expansion bushing and in a backward and traction movement of the same expansion (Continued)

bushing, with the cam mechanism and the actuation unit housed in the casing or container body and actuated by a tool.

17 Claims, 8 Drawing Sheets

(51) Int. Cl.
*A47B 96/06* (2006.01)
*F16B 12/22* (2006.01)
*F16B 12/54* (2006.01)
*A47B 47/04* (2006.01)
*F16B 12/46* (2006.01)
*F16B 12/00* (2006.01)

(52) U.S. Cl.
CPC .......... *F16B 12/2036* (2013.01); *F16B 12/22* (2013.01); *F16B 12/54* (2013.01); *A47B 47/00* (2013.01); *A47B 47/042* (2013.01); *A47B 2230/0033* (2013.01); *A47B 2230/07* (2013.01); *A47B 2230/16* (2013.01); *F16B 12/00* (2013.01); *F16B 12/46* (2013.01)

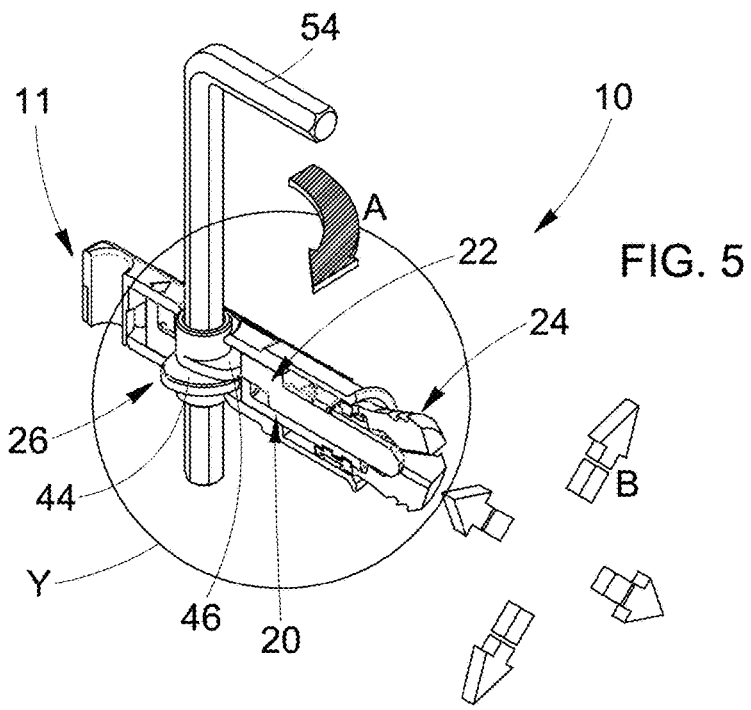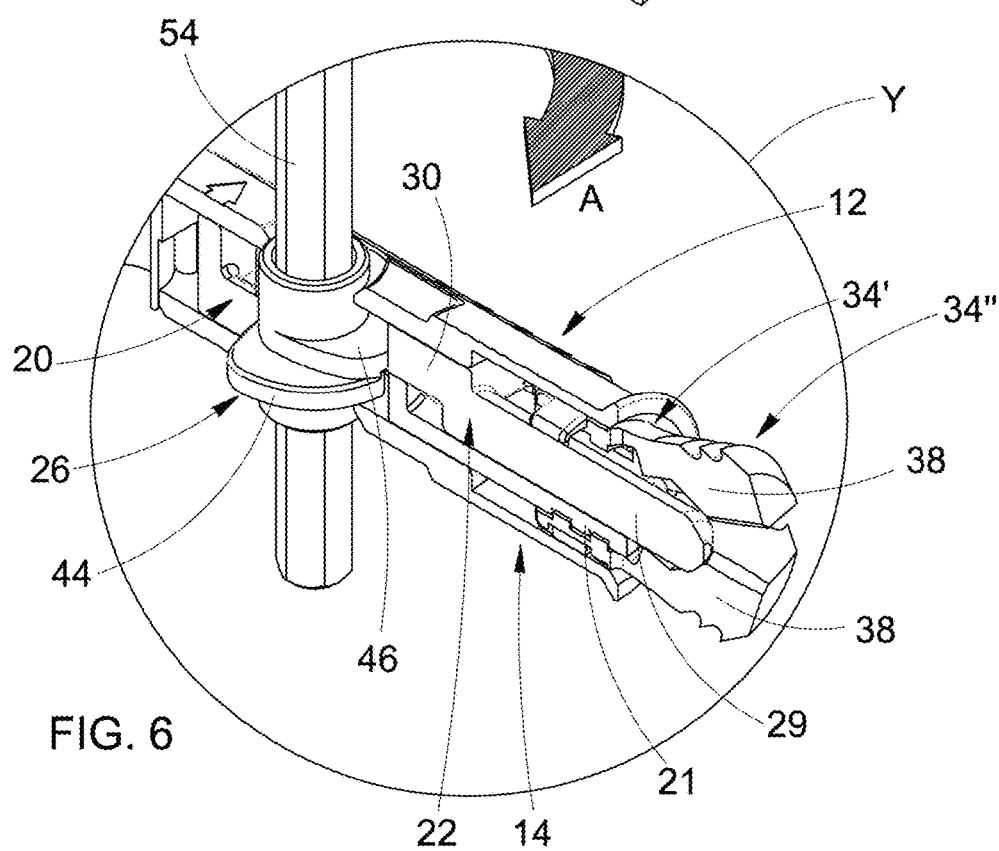

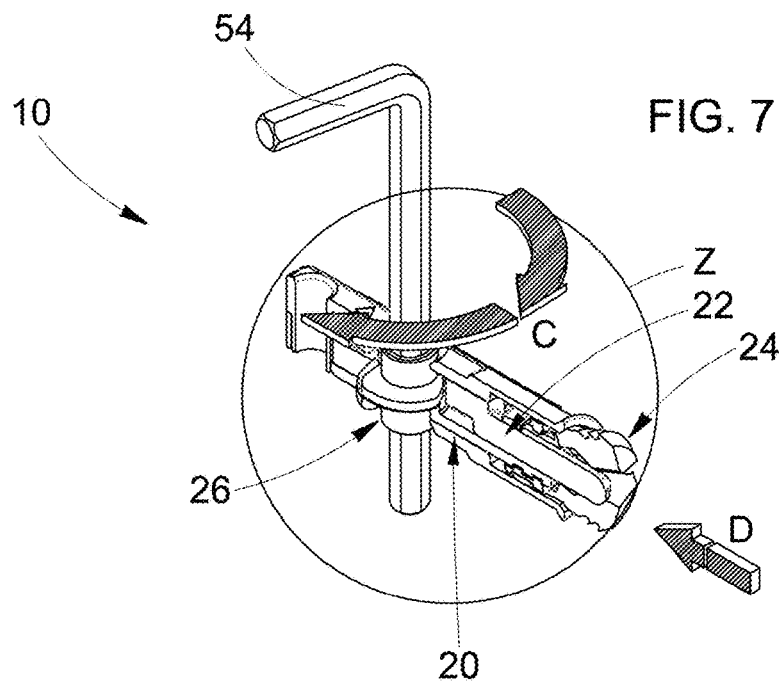
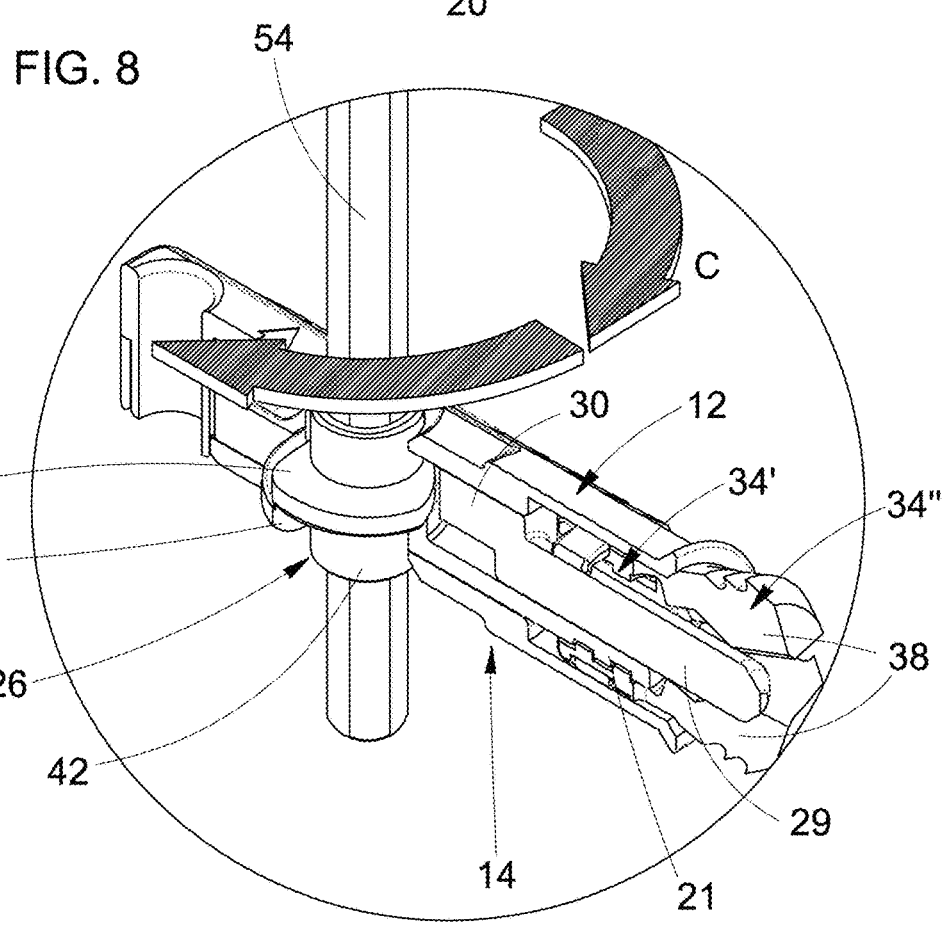

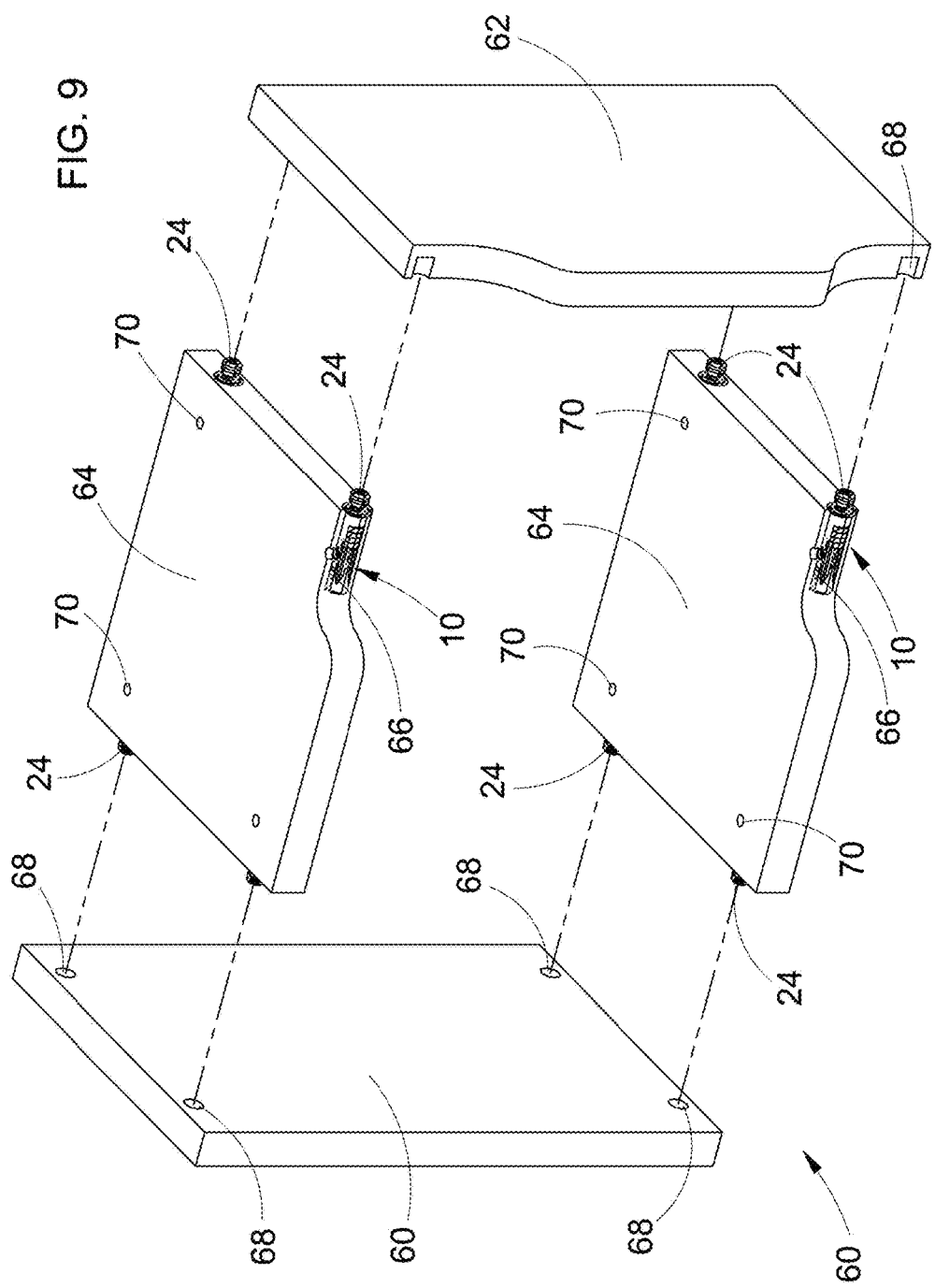

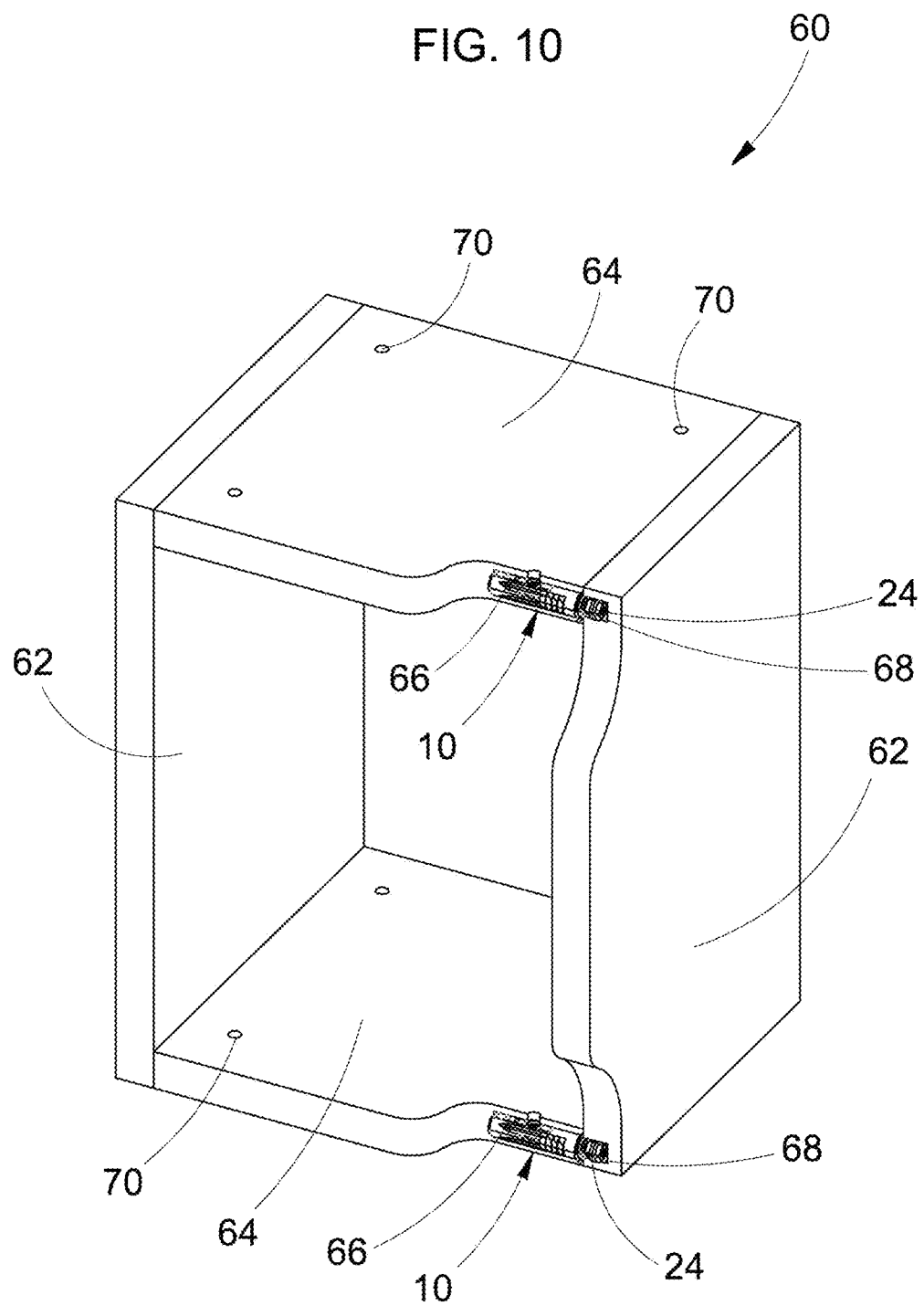

DEVICE FOR JOINING OF PARTS OF FURNITURE AND FURNISHING ACCESSORIES

The present invention relates to a device for joining of parts of furniture and furnishing accessories.

More particularly the present invention relates to a device suitable for assembling furniture and/or furnishing accessories of the shelf unit, bookcase, drawer unit, bed frame, seating type and the like.

As is known, furniture and furnishing accessories are made increasingly frequently by stably and removably joining single parts which will go to define the overall assembly represented, for example, by a bookcase or by a shelf unit, by a chair or by any other item of furniture not made in a single piece but defined by an assembly of single parts.

Such a kit structure entails considerable advantages linked, for example, to a facility of transport of structures, even bulky ones, to the possibility of mounting of the furniture directly on site or, likewise, to the possibility of transport and assembly also by non-expert users.

The retaining elements used to join one to the other the different components or single parts of the furniture are defined, for example, by tie rods or bushings, cams and similar means.

Referring by way of an example to an item of furniture of the bookcase type or to a shelf unit, it comprises typically two vertical uprights tendentially parallel one to the other between which are interposed, along a plane perpendicular to the plane of longitudinal development of the same uprights, one or more shelves having the function of defining a plane of resting and support for books, magazines, vases and/or other multiple and different objects.

The assembly of the structure of the frame and of the shelves with respect to said frame can be performed using retaining means represented by bushings or cams inserted in the thickness of the shelves (or of the uprights) and co-operating in clamping with corresponding pins or screws inserted in the uprights (or in the shelves) and which, actuated by means of an appropriate tool (screwdriver or Allen key or the like), cause the rotation of the bushing or of the cam so as to form the restraining of said pin or screw with respect to said bushing or cam.

However these clamping or restraint means entail some major disadvantages linked to the need to form grooves for housing components in co-operation (bushing and screw or pin) in the thickness of the parts in reciprocal coupling (both in the shelves and in the uprights).

Moreover said same clamping means entail longer times of assembly since the operative has to insert the bushing or the cam and the screw or pin in the respective seats and, subsequently, act on the screw or pin to perform the clamping.

In order to solve these disadvantages other ways of removable joining have been developed which provide for the use of expansion joints apt to be inserted in the thickness of the uprights or of the shelves, with said joints which comprise an expansion bushing typically made in plastic material and a screw inserted coaxially to said bushing and, likewise, an eccentric bushing inserted in a groove formed in the thickness of one of the parts to be joined and apt to couple with the screw or pin of the expansion joint. The reciprocal clamping between the two components of the furniture takes place by acting with a tool which acts on the eccentric bushing which, rotating, imposes a backward movement of the pin with respect to the bushing wherein the same is inserted with a consequent radial expansion of the same bushing.

However these traditional expansion joints also entail some major disadvantages linked to the fact that they comprise elements to be inserted in both the parts to be assembled with the consequent need to form suitable grooves and seats in said parts of the furniture.

A further disadvantage is linked to longer assembly times, in that the user has to insert the elements of the expansion joint in the seats of the parts to be joined and, subsequently, has to act on the eccentric bushing to impose the movement of the pin and the consequent expansion of the bushing in its seat.

A further disadvantage is represented by the fact that a possible loosening of the eccentric bushing entails a consequent movement of the pin and a return into a non-expanded position of the bushing of the pin and this may cause an inevitable loosening of the clamping restraint between the parts of the furniture.

EP 0949 424 discloses a device for joining two wooden sheets consisting of a bolt, flattened at its front area. It forms an insertion plate, which can be longitudinally moved inside a case, with a tensioning, a clamping, and a spreading area. The flat front part of the bolt has an opening for the insertion of an eccentric element which can be rotated clockwise for locking the device and to join the two furniture parts.

The object of the present invention is that of obviating the disadvantages stated above.

More particularly the object of the present invention is that of providing a single-part joining device for parts of furniture and furnishing accessories which comprises a reduced number of components.

A further object of the present invention is that of providing a joining device which allows the reduction in the number of machining processes to be performed on the parts to be reciprocally assembled.

A further object of the present invention is that of providing a joining device which does not involve possible risks of loosening of the clamping between the assembled parts.

A further object of the present invention is that of providing a joining device which allows a reduction in the times of assembly and disassembly together with an easy, convenient and rapid assembly and disassembly of the component parts of the item of furniture (for example the mounting of shelves in a bookcase).

A further object of the present invention is that of making available to users a joining device for parts of furniture or furnishing accessories suitable for guaranteeing a high level of resistance and reliability in time and such, moreover, as to be able to be easily and economically manufactured.

These and other objects are achieved by the apparatus of the invention which has the features as claimed in claim 1.

According to the invention a joining device is provided for parts of furniture and furnishing accessories, of the shelf unit, bookcase, drawer unit, bed frame, seating type and the like, comprising a casing or container body suitable for being inserted in a seat formed in one of the components of the item of furniture to be joined and provided with an expansion bushing externally projecting with respect to an open end of said casing or container body and suitable for engaging with a further seat of a further component of the item of furniture to be joined to the component wherein the casing or containment body is inserted, said joining device which comprises a cam mechanism for a linear and reciprocated motion of mechanical actuation means co-operating in an expansion deformation movement of the expansion bushing and in a backward and traction movement of said expansion bushing, with said cam mechanism and actuation means housed in the casing or container body and actuated by means of a tool.

Advantageous embodiments of the invention are disclosed by the dependent claims.

The constructional and functional features of the joining device for parts of furniture or furnishing accessories of the present invention will be made clearer by the following detailed description, in which reference is made to the accompanying drawings which illustrate an embodiment thereof given solely by way of a non-limiting example and in which:

FIGS. 3, 5, 7 show axonometric views of the phases of actuation of the joining device of the invention depicted partially sectioned along a vertical longitudinal plane and comprising the actuation tool;

FIGS. 4, 6, 8 show schematically enlarged details of the device of the invention associated, respectively, with FIGS. 3, 5 and 7;

FIG. 9 shows schematically a blown-up axonometric view of an item of furniture apt to be assembled using the joining device of the invention, with said item of furniture partially sectioned to illustrate the housing of said joining device;

FIG. 10 shows an axonometric schematic view of the item of furniture of FIG. 9, assembled and partially sectioned to illustrate the arrangement of the joining devices of the invention;

Figure 1:
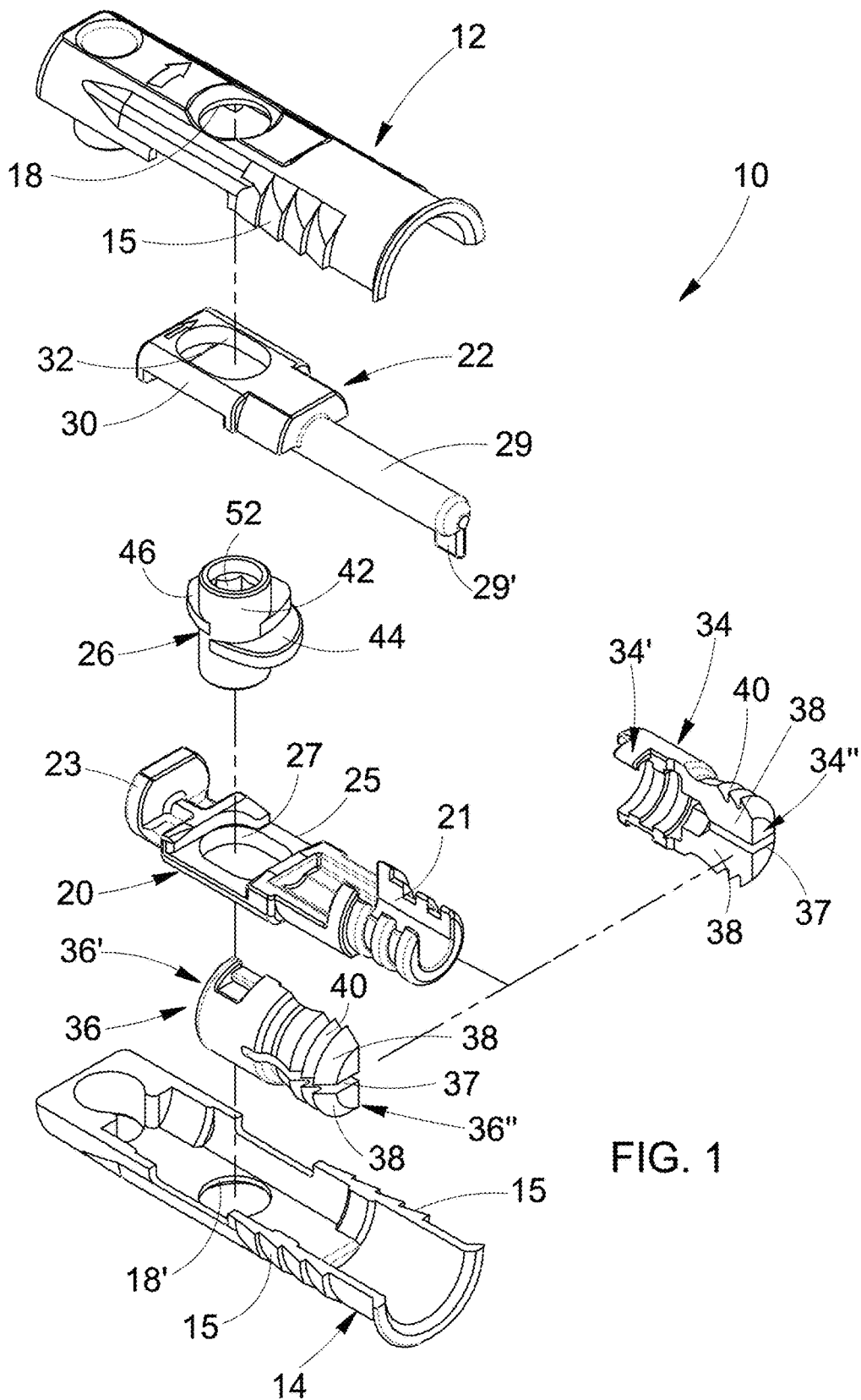
FIG. 1 shows schematically a blown-up axonometric view of the device for joining parts of furniture or furnishing accessories of the present invention.
Figure 2:
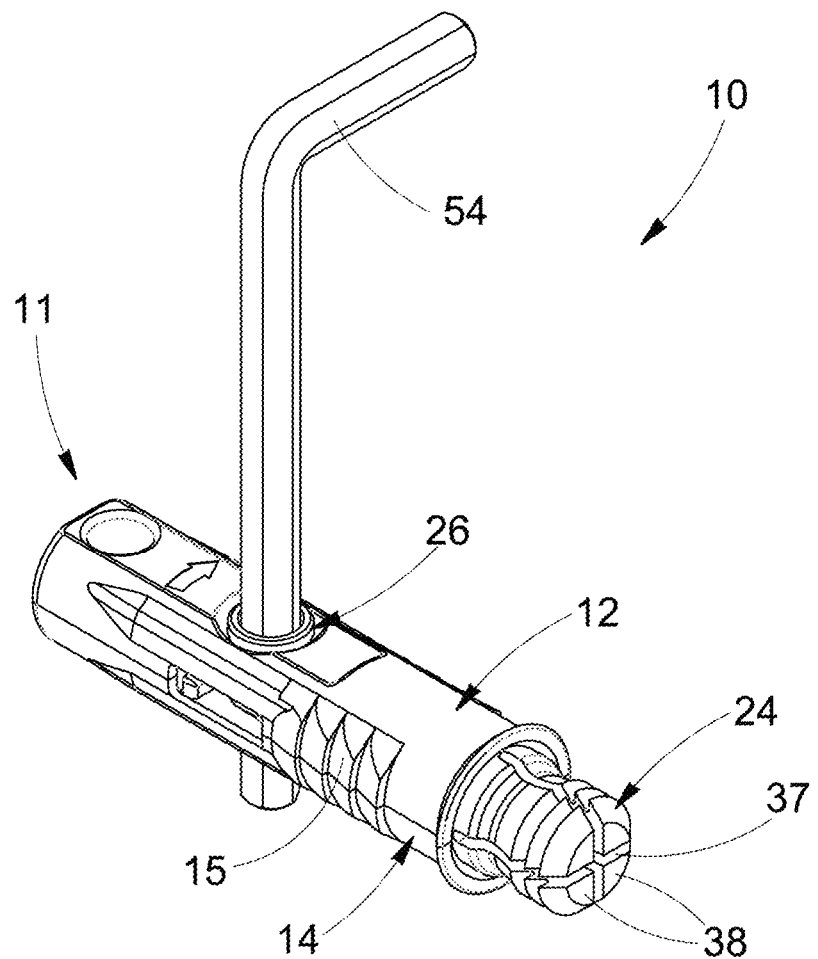
FIG. 2 shows schematically an axonometric view of the device of the invention assembled and provided with the tool for its actuation.

Referring to the aforesaid drawings, the joining device for parts of furniture or furnishing accessories of the present invention, denoted overall by 10 in the aforesaid drawings, comprises a casing or container body 11 with a substantially cylindrical shape, open at one end and defined by an upper half-shell 12 and by a lower half-shell 14, made preferably in zamac, aluminium, brass, plastic material or in another material suitable for the purpose and apt to contain the elements described here below.

The upper half-shell 12 and the lower half-shell 14 are joined one to the other by means of a screw or dowel, by gluing or with another known and suitable method of connection (for example a connection of the snap-fit type in the case of half-shells made in plastic material) and each of them is provided with one or more serrated portions 15 formed in an axial direction along the outer lateral surface of said half-shells and having the function of guaranteeing a greater grip of the casing or container body 11 on the wall of a hole or seat of insertion of the joining device as detailed here below.

The upper half-shell 12 and the lower half-shell 14 have, respectively, a through hole or opening 18 and 18' whose function will appear clearer here below.

Inside the casing or container body 11 are housed the components apt to perform the clamping between the parts of the furniture as described here below and comprising:
 a lower slider 20 placed in the lower half-shell 14;
 an upper slider 22 placed in the upper half-shell 12;
 an expansion bushing 24; and
 a cam mechanism 26.

The lower slider 20 is placed internally and coaxially to the lower half-shell 14 of the casing or container body 11 and comprises a head portion 21 with substantially annular shape, coaxial to the container body and turned in the direction of the open end of the same container body, a base portion 23 turned in the direction of the base of the container body 11, more particularly in the direction of the base of the lower half-shell 14 and a central portion 25 intermediate between said head portion 21 and a base portion 23 and provided with a through slot 27 coaxial with the through holes or openings 18 and 18' of the two half-shells 12 and 14.

The upper slider 22, placed above the lower slider and at the upper half-shell 12, comprises a first portion 29 of cylindrical shape, developed in the direction of the open end of the container body 11 and coaxial to the head portion 21 of the lower slider 20, a second portion 30 developed in the direction of the base of the container body 11 and provided with a further through slot 32 coaxial with the through holes or openings 18 and 18' of the two half-shells 12 and 14 and with the through slot 27 of the lower slider 20. The first portion 29 of the upper slider 22 has, at the end turned in an opposite direction to the second portion 30, an optional appendage 29' developed transversely to said first portion 29 and in the direction of the head portion 21 of the lower slider 20, whose function will be made clearer here below.

The expansion bushing 24, in the preferred embodiment shown in the drawings, comprises a first half-body 34 and a second half-body 36, coupled one to the other and fitted as well as secured (for example with a deformation coupling) on the head portion 21 of the lower slider 20 and coaxial to said same head portion.

The first half-body 34 and the second half-body 36 of the expansion bushing 24 comprise, respectively, a rear portion 34' and 36' of semi-tubular shape apt to couple with said head portion 21 of the lower slider 20 and a front portion 34" and 36" which comprises a cut 37 made along a diametrical plane to define two wings 38 externally provided with teeth 40 formed in axial direction.

The cam mechanism 26 comprises a central body 42, placed coaxially to the holes or openings 18 and 18', of cylindrical shape and with external diametrical dimensions which correspond substantially to those of the holes or openings 18 and 18' and to those of the through slot 27 of the lower slider 20 and of the further through slot 32 of the upper slider 22. In fact the central body 42 engages with the through slot 27, the further through slot 32 and with the holes or openings 18 and 18' to perform the movement described here below.

Said central body 42 comprises, likewise, a central hole 52 shaped to allow the introduction of a tool 54 (shown in FIG. 1) suitable for the actuation of the cam as detailed here below.

From the outer lateral surface of said central body 42 of the cam mechanism 26, at a central portion of said lateral surface, develop, substantially opposing and along two planes parallel one to the other and perpendicular to the axis of the central body, a first lobe 44 or lower lobe and a second lobe 46 or upper lobe apt to come into contact, respectively, with an internal profile of the central portion 25 of the lower slider 20 and with an internal profile of the second portion 30 of the upper slider 22 for the functions described in detail here below.

The profiles of said first lobe 44 and second lobe 46 are chosen as a function of the law of movement or law of the lifts calculated to move, as explained here below, the lower slider 20 and the upper slider 22.

The functioning of the joining device for parts of furniture and furnishing accessories of the present invention, described in detail above with reference to the constructional features, is illustrated here below with reference to FIGS. 3 to 8.

Figure 3:
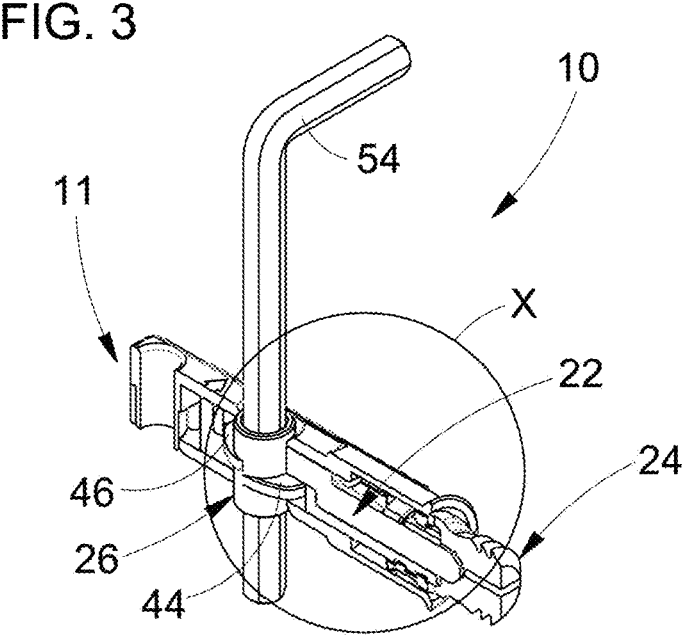
Figure 4:
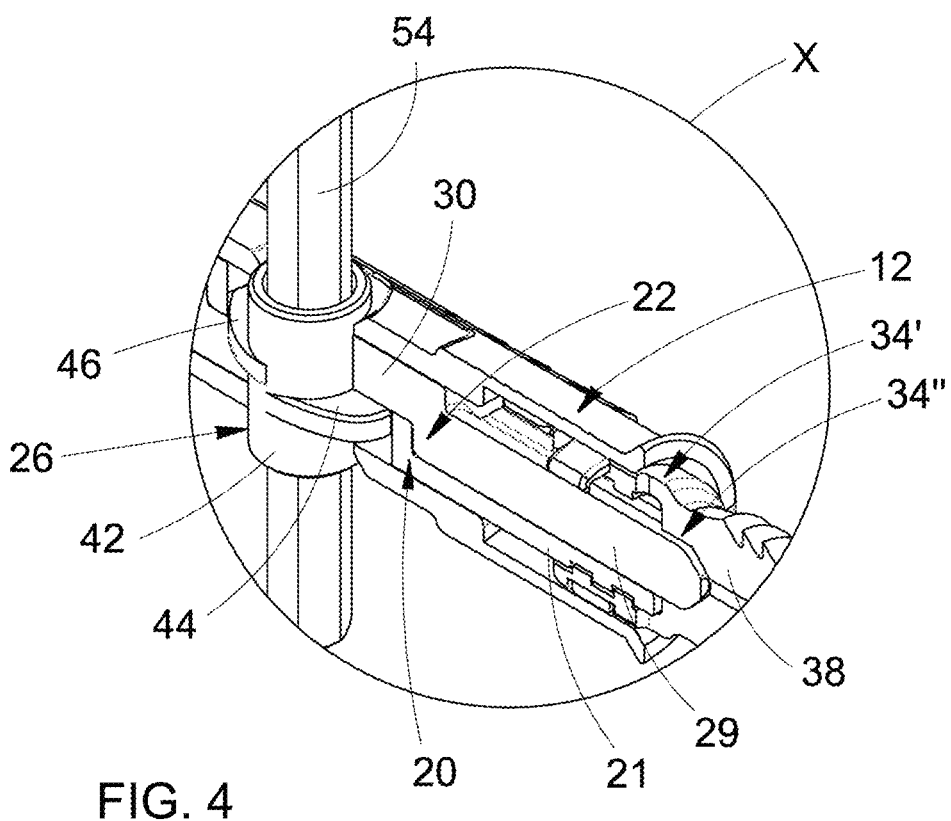

Referring to FIG. 3 and to the enlarged detail X of FIG. 4, the rest configuration of the joining device of the invention is shown with the tool 54 inserted in the central hole 52 of the central body 42 of the cam 26.

In this configuration the upper slider 22 is in the position of maximum backward movement with the appendage 29' abutted against the edge of the head portion 21 of the lower slider 20.

FIG. 5 and the enlarged detail Y of FIG. 6 show a configuration of first actuation displacement of the device of the invention.

More particularly, as indicated by the arrow "A", by means of the tool 54 a rotation is imposed, preferably, through 90° on the cam mechanism 26, as a consequence whereof the second lobe 46 or upper lobe exerts an action of thrust on the internal profile of the second portion 30 of the upper slider 22 which, consequently, translates in the direction of the open end of the casing or container body 11.

The first portion 29 of the upper slider 22, following the thrust action exerted by the second lobe 46 of the cam mechanism 26, advances internally and coaxially to the head portion 21 of the lower slider 20, engages with the rear portion of the bushing 24 and, advancing in the direction of the front portion of the same bushing, imposes an opening in radial direction (as indicated by the arrows "B" in FIG. 5) of the wings 38 of the first half-body 34 and of the second half-body 36 defining the expansion bushing 24 in the preferred embodiment. In particular FIGS. 3 to 8 depict only the half-body 34 of the expansion bushing 24, taking account of the fact that the movement and deformation of the half-body 36 is totally similar.

During this configuration of first displacement or expansion of the device of the invention the lower slider 20 remains at a standstill.

Referring to FIG. 7 and to the enlarged detail Z of FIG. 8, a configuration of second movement of the joining device of the invention is shown.

As indicated by the arrow "C" of the drawings, by means of the tool 54 a further rotation is imposed, preferably, through 90° of the cam mechanism 26. This rotation takes place starting from the configuration of first displacement described previously.

As a consequence of said rotation the first lobe 44 or lower lobe of the cam mechanism 26 exerts a thrust action on the internal profile of the central portion 25 of the lower slider 20 which moves backwards in the direction of the base of the casing or container body 11 as indicated by the arrow "D" in FIG. 7 (the first lobe 44 develops substantially opposite the second lobe 46).

Taking account of the fact that the expansion bushing 24 is fitted and coupled to the head portion 21 of the lower slider 20 the backward displacement of said lower slider imposes a consequent and correlated backward movement of the expansion bushing 24. Said lower slider exerts an action of traction of the expansion bushing 24.

During this displacement of the lower slider 20 the upper slider 22 remains at a standstill, in that in constant engagement with the second lobe 46 of the cam mechanism 26 and, taking account of the fact that the expansion bushing 24 also moves backwards, the first portion 29 of the upper slider 22 engages further with the front portion of the expansion bushing causing a further radial opening of the wings 38 of the first half-body 34 and of the second half-body 36 defining the expansion bushing 24 in the preferred embodiment, so as to perform the stable clamping of the parts of the furniture as described here below.

The through slot 27 of the lower slider 20 and the further through slot 32 of the upper slider 22 accompany the sliding of said sliders with respect to the cam mechanism 26 actuated in rotation by means of the tool 54.

FIGS. 9 to 12 illustrate an example of an item of furniture assembled using the joining device of the invention.

FIG. 9 shows a blown-up axonometric view of an item of furniture 60 comprising two opposite and parallel shoulders 62 and two shelves 64 interposed between said opposite shoulders, perpendicular to the same and parallel one to the other.

In the thickness of the shelves 64 grooves or pockets 66 are formed, having the function of housing the joining devices 10 of the invention, inserted in said grooves or pockets with the front portion of the bushing 24 which projects externally to said pocket and is apt to insert in a further pocket 68 formed in the thickness of the shoulders 62.

The shelves 64 have, likewise, holes 70 formed perpendicularly to the axis of the grooves or pockets 66 and having the function of allowing the insertion of the tool 53 which couples with the central hole 52 of the cam mechanism 26 to perform the clamping action.

Figure 11:
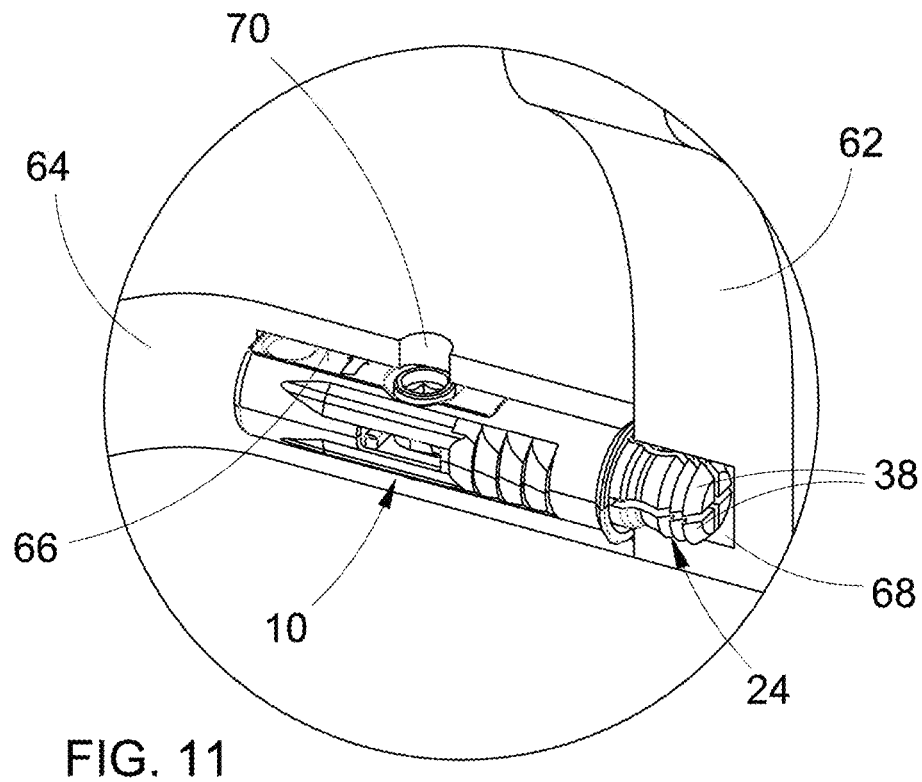
FIGS. 11 and 12 illustrate schematically two enlarged details of the joining device of the invention, said enlarged details apt to show two phases of clamping between the parts of the item of furniture of FIGS. 9 and 10 after the coupling of said parts.
Figure 12:
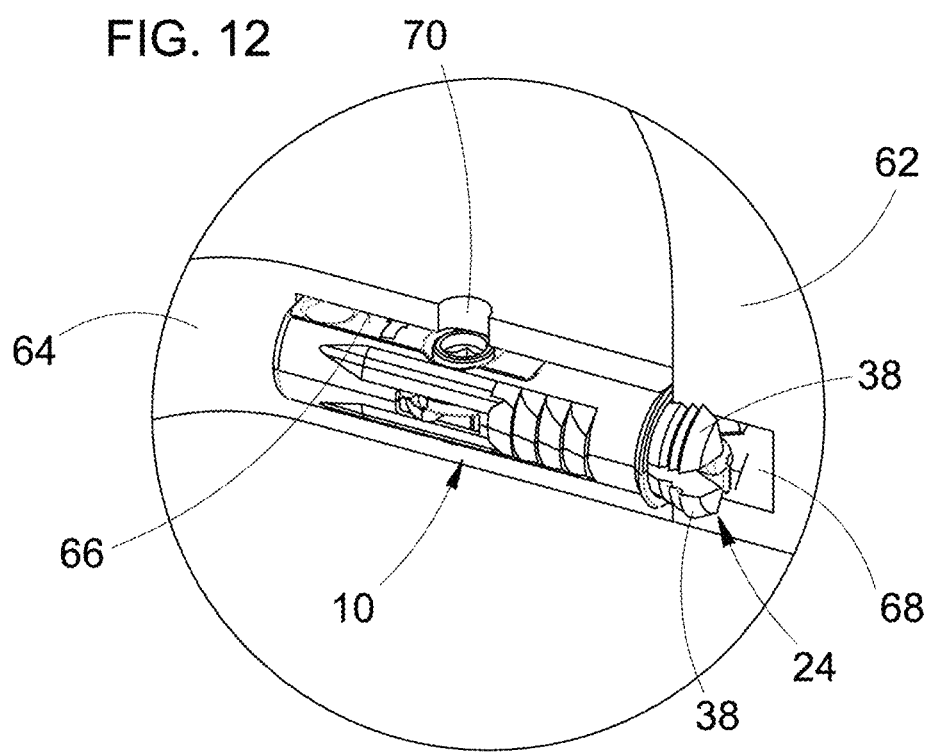

FIGS. 11 and 12 show two enlarged details of a portion of the item of furniture 60 assembled using the joining device of the invention and wherein the device 10 is shown in the rest configuration with the front portion of the expansion bushing 24 inserted in the further pocket 68 of the shoulder 62 of the item of furniture (detail of FIG. 11) and in the configuration of second movement wherein the expansion bushing, following the action of traction exerted by the lower slider 20, performs the clamping with respect to the walls of said further pocket and, consequently, the rigid and stable connection of the shelf 64 with respect to the shoulder 62.

The first rotation through 90° imposes the expansion of the expansion bushing 24 with the opening of the wings of said expansion bushing which performs an actuation of clamping with radial stress with respect to the groove or pocket 66 and the second rotation through 90°, imposing a backward movement of the expansion bushing with a further expansion, associates with the radial stress a traction stress between the two components of the item of furniture defining, in this way, a stable clamping between the parts without risks of loosening of the restraint.

The optional disassembly of the item of furniture can be implemented by imposing, by means of the tool 54, a rotation in an opposite direction to that which characterises the phase of assembly/clamping, so as to return the device into the rest configuration.

In particular the passage from the configuration of FIG. 11 to the clamping of FIG. 12 takes place by imposing on the cam 26, by means of the tool 54, an overall rotation of 180° (with reference to the preferred embodiment).

As can be seen from the above the advantages that the joining device for parts of furniture or furnishing accessories of the present invention achieves are clear.

The joining device for parts of furniture and furnishing accessories of the present invention allows advantageously the assembly/disassembly of furniture or furnishing accessories in a rapid and easy manner also by non-expert users.

In fact the constructional configuration of the joining device and, in particular, the cam mechanism 26, allows performing of the clamping or unclamping between the parts simply by imposing on said cam an overall rotation through 180° (by means of the tool 54) without the need for a particular or high torque value.

It has to be borne in mind that the overall rotation of the cam mechanism can also be different from that described with reference to the preferred embodiment and, for example, equal to 90° or 360° with consequent semi-rotations (first configuration of movement or expansion and second configuration of movement or action of traction) equal to 45° or 180° respectively.

Further advantageous is the fact that the device of the invention avoids the risk of a possible loosening of the restraint between the parts in connection. In fact the action of traction exerted on the expansion bushing by means of the backward movement of the lower slider through the effect of the movement imposed by the cam mechanism imposing a further rotation on the same cam starting from the configuration of first movement or expansion stiffens and makes more stable the restraint of clamping between the parts of the furniture in connection.

A further advantage is represented by the fact that only the clamping device of the invention allows the restraint and clamping to be formed between the parts using a single component (the clamping device 10) inserted in a seat formed in the thickness of one of the two components and without the need to have to use further components to be coupled such as, for example, in the case of a traditional expansion pin which, for the deformation in expansion of the bushing, needs an eccentric bushing (inserted in the thickness of the component facing that which houses the pin).

A further advantage of the joining device of the present invention is represented by the fact that it allows connection one to the other of parts of an item of furniture maintaining the joining device completely hidden from view so as to guarantee a high aesthetic value for the item of furniture or furnishing accessory assembled.

Although the invention has been described above with particular reference to one of its embodiments given solely by way of a non-limiting example, numerous changes and variations will appear clear to a person skilled in the art in light of the description given above. The present invention therefore intends embracing all the changes and variations which come within the scope of the following claims.

The invention claimed is:

1. A joining device (10) for parts of furniture and furnishing accessories, of a shelf unit, bookcase, drawer unit, bed frame, seating type, comprising a casing or container body (11) suitable for being inserted in a seat formed in one of the parts of furniture to be joined and provided with an expansion bushing (24) externally projecting with respect to an open end of said casing or container body and suitable for engaging with a further seat of a further part of furniture to be joined wherein the casing or containment body (11) is inserted, said joining device further comprising a cam mechanism (26) for a linear and reciprocated motion of actuation means co-operating in an expansion deformation movement of the expansion bushing (24) and in a backward and traction movement of said expansion bushing, with said cam mechanism and actuation means housed in the casing or container body (11) and actuated by a tool (54), said means of actuation of the bushing comprising a lower slider (20) and an upper slider (22) overlapping and reciprocally sliding by means of said cam mechanism (26).

2. The joining device according to claim 1, wherein the lower slider (20) comprises a head portion (21) turned in the direction of the open end of the casing or container body (11) and supports the expansion bushing (34), the upper slider (22) comprising a first portion (29) in the direction of the open end of the casing or container body (11), coaxial to the head portion (21) of the lower slider (20) and suitable for being inserted in said head portion.

3. The joining device according to claim 2, wherein the expansion bushing (24) comprises a first half-body (34) and a second half-body (36) coupled one to the other and coaxially fitted/secured to the head portion (21) of the lower slider (20) and comprising a cut (37) made along a diametrical plane to define two opposing wings (38) externally provided with teeth (40) formed in an axial direction.

4. The joining device according to claim 3, wherein said first half-body (34) and second half-body (36) of the expansion bushing (24) are joined to form a single part.

5. A method of joining of parts of modular furniture (60) or furnishing accessories by the joining device (10) according to claim 4, comprising the steps of:
   insertion of the joining device (10) in a groove or pocket (66) formed in one of the parts to be joined, with a front portion of the bushing (24) projecting outside said groove or pocket (66) and inserted in a further pocket (68) formed in the further part to be joined;
   first rotational actuation of the cam mechanism (26) to exert a thrust action on the upper slider (22) and to impose an expansion of the bushing to exert an action of radial pressure on a lateral surface of said groove or pocket (66);
   second rotational actuation of the cam mechanism (26) to exert a thrust action on the lower slider (20) and impose a traction on the expansion bushing (24) which moves backwards with respect to the casing or container body (11) exerting a further action of radial pressure on the lateral surface of the groove or pocket (66) together with an action of traction on said further part to be joined.

6. A method of joining of parts of modular furniture (60) or furnishing accessories by the joining device (10) according to claim 3, comprising the steps of:
   insertion of the joining device (10) in a groove or pocket (66) formed in one of the parts to be joined, with a front portion of the bushing (24) projecting outside said groove or pocket (66) and inserted in a further pocket (68) formed in the further part to be joined;
   first rotational actuation of the cam mechanism (26) to exert a thrust action on the upper slider (22) and to impose an expansion of the bushing to exert an action of radial pressure on a lateral surface of said groove or pocket (66);
   second rotational actuation of the cam mechanism (26) to exert a thrust action on the lower slider (20) and impose a traction on the expansion bushing (24) which moves backwards with respect to the casing or container body (11) exerting a further action of radial pressure on the lateral surface of the groove or pocket (66) together with an action of traction on said further part to be joined.

7. A method of joining of parts of modular furniture (60) or furnishing accessories by the joining device (10) according to claim 2, comprising the steps of:
   insertion of the joining device (10) in a groove or pocket (66) formed in one of the parts to be joined, with a front portion of the bushing (24) projecting outside said groove or pocket (66) and inserted in a further pocket (68) formed the further part to be joined;

first rotational actuation of the cam mechanism (26) to exert a thrust action on the upper slider (22) and to impose an expansion of the bushing to exert an action of radial pressure on a lateral surface of said groove or pocket (66);

second rotational actuation of the cam mechanism (26) to exert a thrust action on the lower slider (20) and impose a traction on the expansion bushing (24) which moves backwards with respect to the casing or container body (11) exerting a further action of radial pressure on the lateral surface of the groove or pocket (66) together with an action of traction on said further part to be joined.

8. The joining device according to claim 1, wherein the cam mechanism (26) comprises a central body (42) which, at a central portion of an outer lateral surface, comprises a first lobe (44) or lower lobe and a second lobe (46) or upper lobe substantially opposite along two planes reciprocally parallel and perpendicular to an axis of the central body (42) and comes into contact, respectively, with an internal profile of the lower slider (20) and with an internal profile of the upper slider (22).

9. The joining device according to claim 8, wherein the central body (42) of the cam mechanism (26) comprises a central hole (52) shaped to allow the introduction of the tool (54) to actuate rotation of said cam mechanism (26).

10. The joining device of claim 9, wherein the central hole passes through the central body of the cam mechanism.

11. A method of joining of parts of modular furniture (60) or furnishing accessories by the joining device (10) according to claim 10, comprising the steps of:

insertion of the joining device (10) in a groove or pocket (66) formed in one of the parts to be joined, with a front portion of the bushing (24) projecting outside said groove or pocket (66) and inserted in a further pocket (68) formed in the further part to be joined;

first rotational actuation of the cam mechanism (26) to exert a thrust action on the upper slider (22) and to impose an expansion of the bushing to exert an action of radial pressure on a lateral surface of said groove or pocket (66);

second rotational actuation of the cam mechanism (26) to exert a thrust action on the lower slider (20) and impose a traction on the expansion bushing (24) which moves backwards with respect to the casing or container body (11) exerting a further action of radial pressure on the lateral surface of the groove or pocket (66) together with an action of traction on said further part to be joined.

12. A method of joining of parts of modular furniture (60) or furnishing accessories by the joining device (10) according to claim 9, comprising the steps of:

insertion of the joining device (10) in a groove or pocket (66) formed in one of the parts to be joined, with a front portion of the bushing (24) projecting outside said groove or pocket (66) and inserted in a further pocket (68) formed in the further part to be joined;

first rotational actuation of the cam mechanism (26) to exert a thrust action on the upper slider (22) and to impose an expansion of the bushing to exert an action of radial pressure on a lateral surface of said groove or pocket (66);

second rotational actuation of the cam mechanism (26) to exert a thrust action on the lower slider (20) and impose a traction on the expansion bushing (24) which moves backwards with respect to the casing or container body (11) exerting a further action of radial pressure on the lateral surface of the groove or pocket (66) together with an action of traction on said further part to be joined.

13. The joining device according to claim 8, wherein the casing or container body (11) comprises a first half-shell (12) and a second half-shell (14), a hole or through opening (18, 18') formed in a perpendicular direction to a longitudinal axis of said half-shells and coaxial with a through slot (27) of the lower slider (20) and with a further through slot (32) of the upper slider (22), said holes (18, 18') suitable for holding, respectively, an upper portion and a lower portion of the central body (42) of the cam mechanism (26) and for supporting rotation of said cam mechanism.

14. A method of joining of parts of modular furniture (60) or furnishing accessories by the joining device (10) according to claim 13, comprising the steps of:

insertion of the joining device (10) in a groove or pocket (66) formed in one of the parts to be joined, with a front portion of the bushing (24) projecting outside said groove or pocket (66) and inserted in a further pocket (68) formed in the further part to be joined;

first rotational actuation of the cam mechanism (26) to exert a thrust action on the upper slider (22) and to impose an expansion of the bushing to exert an action of radial pressure on a lateral surface of said groove or pocket (66);

second rotational actuation of the cam mechanism (26) to exert a thrust action on the lower slider (20) and impose a traction on the expansion bushing (24) which moves backwards with respect to the casing or container body (11) exerting a further action of radial pressure on the lateral surface of the groove or pocket (66) together with an action of traction on said further part to be joined.

15. A method of joining of parts of modular furniture (60) or furnishing accessories by the joining device (10) according to claim 8, comprising the steps of:

insertion of the joining device (10) in a groove or pocket (66) formed in one of the parts to be joined, with a front portion of the bushing (24) projecting outside said groove or pocket (66) and inserted in a further pocket (68) formed in the further part to be joined;

first rotational actuation of the cam mechanism (26) to exert a thrust action on the upper slider (22) and to impose an expansion of the bushing to exert an action of radial pressure on a lateral surface of said groove or pocket (66);

second rotational actuation of the cam mechanism (26) to exert a thrust action on the lower slider (20) and impose a traction on the expansion bushing (24) which moves backwards with respect to the casing or container body (11) exerting a further action of radial pressure on the lateral surface of the groove or pocket (66) together with an action of traction on said further part to be joined.

16. A method of joining of parts of modular furniture (60) or furnishing accessories by the joining device (10) according to claim 1, comprising the steps of:

insertion of the joining device (10) in a groove or pocket (66) formed in one of the parts to be joined, with a front portion of the bushing (24) projecting outside said groove or pocket (66) and inserted in a further pocket (68) formed in the further part to be joined;

first rotational actuation of the cam mechanism (26) to exert a thrust action on the upper slider (22) and to impose an expansion of the bushing to exert an action of radial pressure on a lateral surface of said groove or pocket (66);

second rotational actuation of the cam mechanism (26) to exert a thrust action on the lower slider (20) and impose a traction on the expansion bushing (24) which moves backwards with respect to the casing or container body (11) exerting a further action of radial pressure on the lateral surface of the groove or pocket (66) together with an action of traction on said further part to be joined.

17. The method of joining of parts of furniture according to claim 16, wherein during the first rotational actuation of the cam mechanism the upper slider (22) translates in a forward movement with the lower slider (20) which remains still and during the second rotational actuation of the cam mechanism the lower slider (20) translates in a backward movement with the upper slider (22) which remains still.

\* \* \* \* \*